(12) United States Patent
Cai et al.

(10) Patent No.: US 9,333,382 B2
(45) Date of Patent: May 10, 2016

(54) **ENHANCED COMBINATION METHOD FOR PHYTOREMEDIATION OF PETROLEUM CONTAMINATED SOIL BY *IMPATIENS BALSAMINA* L. ASSOCIATED WITH THE INDIGENOUS MICROORGANISMS**

(71) Applicant: Nankai University, Tianjin (CN)

(72) Inventors: Zhang Cai, Tianjin (CN); Qixing Zhou, Tianjin (CN); Lijuan Cheng, Tianjin (CN); Ruiren Zhou, Tianjin (CN); Xin Wang, Tianjin (CN); Jingchun Tang, Tianjin (CN); Qingmin Zhang, Tianjin (CN); Jie Liu, Tianjin (CN); Weitao Liu, Tianjin (CN); Junjie Yang, University Park, PA (US)

(73) Assignees: ZHEJIANG ZEHAN ENVIRONMENTAL TECHNOLOGY CO., LTD, Yiwu (CN); Nankai University, Tianjin (CN)

( * ) Notice: Subject to any disclaimer, the term of this patent is extended or adjusted under 35 U.S.C. 154(b) by 0 days.

(21) Appl. No.: 14/251,618

(22) Filed: Apr. 13, 2014

(65) Prior Publication Data
US 2015/0104855 A1    Apr. 16, 2015

(30) Foreign Application Priority Data
Oct. 12, 2013  (CN) .......................... 2013 1 0475850

(51) Int. Cl.
*B09C 1/10* (2006.01)
*A62D 3/02* (2007.01)
*A62D 101/20* (2007.01)

(52) U.S. Cl.
CPC ... *A62D 3/02* (2013.01); *B09C 1/10* (2013.01); *B09C 1/105* (2013.01); *A62D 2101/20* (2013.01)

(58) Field of Classification Search
CPC ............. B09C 1/10; B09C 1/105; A62D 3/02
USPC ....................................... 435/262.5
See application file for complete search history.

(56) References Cited

PUBLICATIONS

Cai et al. "Promoted biodegradation and microbiological effects of petroleum hydrocarbons by Impatiens balsamina L. with strong endurance" (2010) Journal of Hazardous Materials, vol. 183: 731-737.*
Khan et al. "Plant-bacteria partnership for the remediation of hydrocarbon contaminated soils." (Jan. 2013), vol. 90, No. 4: 1317-1332.*
Das and Chandran, "Microbrial Degradation of Petroleum Hydrocarbon Contaminants: An Overview" (2011), vol. 2011, Article ID 941810:1-13.*
Kulkarni et al. "Bioremediation of Petroleum Hydrocarbons in Soils" in "Microorganisms in Environmental Management: Microbes and Environment." (2012) DOI 10.1007/978-94-007-2229, p. 589-606.*

* cited by examiner

*Primary Examiner* — Robert Yamasaki
*Assistant Examiner* — Teresa E Knight (57) ABSTRACT

A plant-microorganism combined method for phhytoremediation of organic contaminated soil; i.e., an ornamental plant (*Impatiens balsamina* L.)—microorganisms (petroleum hydrocarbon degrading mixed microbes) combined method for enhanced phytoremediation of petroleum contaminated soil is disclosed. The inoculated petroleum degrading mixed microbes can not only degrade contaminants in soil directly but also secretes chemical substances which are helpful to relieve the toxic effects on the *Impatiens balsamina* L. In return, the *Impatiens balsamina* L. releases photosynthesis products into the soil, so as to enhance microbial activity and quantity, and assist the microorganisms in degrading target contaminates more effectively and efficiently. Repeating the processes mentioned above is able to continuously reduce petroleum hydrocarbon contaminants in the soil until the residual content of contaminants meets the environmental safety standard.

3 Claims, 4 Drawing Sheets

ENHANCED COMBINATION METHOD FOR PHYTOREMEDIATION OF PETROLEUM CONTAMINATED SOIL BY *IMPATIENS BALSAMINA* L. ASSOCIATED WITH THE INDIGENOUS MICROORGANISMS

BACKGROUND OF THE PRESENT INVENTION

1. Field of Invention

The present invention relates to the field of environmental restoration technique for soil with organic toxicants pollution, specifically as a method of enhanced remediation of petroleum contaminated soil by utilizing the combination method of an ornamental plant *Impatiens balsamina* L. and mixed hydrocarbon degraders including bacteria and fungi.

2. Description of Related Arts

Soil plays an essential part in the ecosystem and is one of the environmental resources upon which human depend. In the last decades, however, with the increasing types and amounts of toxic organics, more and more organic contaminants transport and enter into the soil environment. The organic contaminants in soil would not only lead to the decay of organisms, but also endanger human health and even ecological safety through the food chain. Furthermore it could bring pollution of surface and subsurface water due to contaminants transportation, which consequently threatens the people's living environment and even exposes human beings to the greater environmental risks. (See Reference 1: Fismes, J.; Perrin-Ganier, C.; Empereur-Bissonnet, P. Soil-to-Root Transfer and Translocation of Polycyclic Aromatic Hydrocarbons by Vegetables Grown on Industrial Contaminated Soils. J. Environ. Qual. 2002, 31, 1649-1656; Reference 2: Zhou Qixing, Kong Fanxiang and Zhu Lin. Ecotoxicology. Beijing, Chemical Industry Press. 2005, 119-144) Therefore, remediation of toxic organic contaminants in soil has been one of the hot research fields in soil and environmental science all around the world. (See Reference 4: Chaudhry, Q; Blomzanddstra, M.; Gupta, S.; Erick J. Joner. Utilising the synergy between plants and rhizosphere microorganisms to enhance breakdown of organic pollutants in the environment. Environ. Sci. & Pollut. Res. 12 (1) 34-48; Reference 5: Euliss K. Ho C H. Schwab A P. et al. 2008. Greenhouse and field assessment of phytoremediation for petroleum contaminants in a riparian zone. Bioresource Technology, 99:1961-1971; Reference 6: Song Yufang, Xu Huaxia, Ren Liping, Bioremediation of mineral oil and polycyclic aromatic hydrocarbons (PAHs) in soils with two plant species[J]. Chinese Journal of Applied Ecology, 2001, (1):108-112). The generated oily mud, cuttings and ground crude oil during the processes of oil exploration and production, storage and transportation could cause serious pollution in a large area in the vicinity of wells. The excess petroleum hydrocarbon (PHC) contaminants in soils will destroy soil structure, scatter earth grain, and reduce the water penetration in soil. What's more, the PHC polluted soil has high hydrophobicity, which will result in the reduction of moisture absorption and water storage, thereafter the plant growth inhibition in it. (See Reference 7: Liste H H. Felgentreu D. 2006. Crop growth, culturable bacteria, and degradation of petrol hydrocarbons (PHCs) in a long-term contaminated field soil. Applied Soil Ecology, 31: 43-52.) The subsurface water could be also polluted due to the infiltration of PHC. (See Reference 8: N. Sawatsky, X. Li. Importance of soil-water relations in assessing the endpoint of bioremediated soils. Plant and Soil. 1997, 192: 227-236.) Therefore, remediation of PHC contaminated soil is necessary and urgent.

Remediation of PHC contaminated soil proves to be difficult in both the academic and practical fields. Present remediation methods include physical-chemical method, and bioremediation method. The conventional physical-chemical method has a high cost and easily results in the secondary pollution, thus it is not suitable for large-scale application. It is noticeable that the microorganism might bring biological pollution to local soils and subsurface water resources. In terms of the organic contaminants which are difficult to be degraded by microorganisms, the bioremediation method cannot be used. Therefore, the safe, reliable and cost-effective new technique will play a more important role in the remediation of organic contaminated soil. (See Reference 9: Dai Shugui, Progress in environmental chemistry, Beijing: Chemical Industry Press: 2005, 119-120). As a new environmental restoration technique, phytoremediation of organic contaminated soil is to in-situ remediate the contaminated soil by adsorbing, degrading and passivating organic contaminants during the plant growth. (See Reference 10: Zhou Qixing, Song Yufang, 2004, principles and methods for remediation of contaminated soil, Beijing: Science press) Compared with the conventional method, the main advantages of phytoremediation of organic contaminated soil include minimal environmental damage, no site disposal, treatment of various toxic substances simultaneously, cost effectiveness, aesthetically pleasing and high public acceptance. (See Reference 11: Macek T. et al. 2000. Biotechnology Advances. 18:23; Reference 12: Euliss K. Ho C H. Schwab A P. et al. 2008. Greenhouse and field assessment of phytoremediation for petroleum contaminants in a riparian zone. Bioresource Technology, 99:1961-1971; Reference 13: Schnoor J L. Phytoremediation Technology Evalution Report, Prepared for Groundwater Remediation Technologies Analysis Center. http://gwrtac.org. 1997; Reference 14: Dai Shugui, Progress in environmental chemistry, Beijing: Chemical Industry Press: 2005, 119-122) Therefore, phytoremediation becomes one of the hot research topics in the remediation field.

When applying the phytoremediation technique, selection of a suitable plant degrading petroleum hydrocarbons in soils is the essential prerequisite and foundation. So far, however, there are few studies on the selection of plants capable to remediate PHCs in soils around the world. The plants with intellectual property used for remediation of PHC contaminated soil are still less. Furthermore, due to the insufficient understanding on the agronomic characters, pest control, breeding potential and physiological characters, the application of phytoremediation has been impeded. (See, Reference 15: Ute K. Phytoremediation: novel approaches to cleaning up polluted soils. Current Opinion in Biotechnology, 2005, 16:133-141.) Therefore, screening more effective species for phytoremediation of PHC contaminated soil is still an important task.

Ornamental plant is a plant group with a long history of utilization, which includes over 400,000 cultivated varieties. China is one of the countries which have the most abundant varieties of ornamental plants in the world. (See References 16, Guo Weiming, Mao Longsheng. Introduction to ornamental horticulture [M]. China Agriculture Press, 2001) Selection of hyperaccumulators from the ornamentals for phytoremediation has the following feasibilities and advantages including: (1) The ornamental plant has abundant species including both the herbaceous and woody plant, which establishes a firm foundation for screening. (2) The ornamental plant can beautify the environment while degrading the pollution, which is killing two birds with one stone. (3) The ornamental plant usually does not enter the food chain, which prevents potential hazards from entering human body. (4) Many ornamental plants have certain economic value, and can serve as the raw materials therefore decreasing the remediation cost. (5) The ornamental plant has a long history of cultivation and the cultivation system has been well established and highly mechanized in China, which guarantee the remediation practice using ornamental plants. (See Reference 17: Liu, J.-n., Zhou, Q.-x., Sun, T., et al. Growth responses of three ornamental plants to Cd and Cd—Pb stress and their metal accumulation characteristics. Journal of Hazardous Materials, 2008, 151(1): 261-267.). Therefore, it is entirely practicable to screen ornamental plants with high PHCs-degrading potentialities, and to apply the plants to the subsequent remediation practice.

The plant-microorganism combined effect can improve the PHC remediation efficiency. The higher plants and their associated rhizosphere microorganisms in the organic contaminated soil with mutual benefits to each other. The higher plants release the photosynthesis products into the soil by the roots. For example, the required nutrients and oxygen for the growth and propagation of the microorganism released by plants can increase the activity and quantity of the microorganisms, improve the diversity of microbial community structures, so as to assist the microorganism in degrading the target organic contaminants more effectively and efficiently.

In return the rhizosphere microorganism secretes chemical substances which can help the plants alleviate the toxic effect of contaminants on the plant roots, so as to help the plant grow healthier and better degrade contaminants. The rhizosphere of the higher plant provides the microorganism with a space suitable for growth and propagation. In the rhizosphere, the combined action of the plant roots and the microorganisms can accelerate the degradation of the organic contaminants, especially those can hardly be degraded by conventional methods.

Plant Growth Promoting Rhizobacteria (PGPR) refers to microorganisms capable of promoting the absorption and utilization of mineral nutrition by the plant, or improving the biomass of the plant, or even refers to microorganisms having an inhibiting effect on the harmful microorganisms. The PGPR usually refers to bacteria which have capability to fix nitrogen, solubilize phosphate and decompose potassium or have function of generating plant hormone. (See Reference 18: Kloepper, J. W., et al., Enhanced plant growth by siderophores produced by plant growth-promoting rhizobacteria. Nature 1980. 286: p. 885-886. Reference 19: Kloepper, J. W. and M. N. Schroth, Relationship of in vitro antibiosis of plant growth-promoting rhizobacteria to plant growth and the displacement of root microflora. Phytopathology, 1981. 71: p. 1020-1024.) The contaminants in soil can make plants generate ethylene which will inhibit the plant growth. However, the PGPR can produce indole-3-acetic acid (IAA) and 1-aminocyclopropane-1-carboxylate (ACC) deaminase. The ACC deaminase can decompose ACC, therefore protecting the plant and enhancing growth. (See Reference 20 Glick, B. R., Modulation of plant ethylene levels by the bacterial enzyme ACC deaminase. FEMS Microbiology Letters, 2005. 251(1): p. 1-7). The reduction of ethylene makes the plant grow better in the contaminated environment and exerts a vital role in the remediation of contaminated soil. In addition, the PGPR serves as the biocontrol bacteria to protect the rhizosphere from the virus invasion. (See Reference 21: Compant, S., et al., Use of plant growth-promoting bacteria for biocontrol of plant diseases: principles, mechanisms of action, and future prospects. Applied and Environmental Microbiology, 2005. 71(9): p. 4951-4959.)

Euliss et al. suggested screening and combining different microorganisms and special plant for enhanced remediation of PHC contaminated soil. (See Reference 22: Liste, H. H. and D. Felgentreu, Crop growth, culturable bacteria, and degradation of petrol hydrocarbons (PHCs) in a long-term contaminated field soil. Applied Soil Ecology, 2006. 31(1-2): p. 43-52.)

Song Yufang et al. discovered that PHC degradation efficiency by microorganisms separated from rhizosphere is much higher than those separated from blank soils. Thus inoculating microorganism can not only protect plants from damage by contaminants but also improve degradation efficiency of PHC. Recent study indicates that inoculating microorganism, especially indigenous microorganism, into contaminated soil can significantly improve the remediation efficiency. Moreover, the indigenous microorganisms adapt easily to the local environment without competing with the local species. (See Reference 23: Atlas, R. M. and R. Bartha, Microbial Ecology: Fundamentals and Applications. 4th ed. 1998, Redwood City, Calif.: Cummings Science Publishing.)

The previous studies are mainly focused on inoculating the PHC degrading bacteria in the soil for enhancing the remediation efficiency. However, the plant-fungi combined method for remediating PHC contaminated soil also has a good efficiency. (See Reference 24: Hashem, A. R., Bioremediation of petroleum contaminated soils in the Arabian Gulf region: a review. J. Kuwait Sci., 2007. 19: p. 81-91). Based on the high PHC degradation efficiency of ornamental plant Impatiens balsamina L., the present invention studies and analyzes the technique of plant-microorganism combined method for remediation of petroleum contaminated soil. The remediation technique adopts the following materials: higher plant Impatiens balsamina L. which has been screened by us before, 3 strains of indigenous bacteria for degrading PHCs: ① Bacillus subtilis, ② Bacillus licheniformis and ③ Bacillus polymyxa, and 2 strains of indigenous fungi for degrading PHCs: ① Trichosporon behrend, and ② Candida tropicalis. Four treatments are applied as follows:

(1) single treatment by planting Impatiens balsamina L.;

(2) planting Impatiens balsamina L. with inoculating solution of petroleum hydrocarbon degrading microorganisms;

(3) planting Impatiens balsamina L. with inoculating solution of plant growth-promoting rhizobacteria (i.e. azotobacter, phosphorus-solubilizing bacteria, potassium bacteria); and (4) planting Impatiens balsamina L. with inoculating solution of petroleum hydrocarbon degrading bacteria and inoculating solution of plant growth-promoting rhizobacteria.

An optimum result will be selected from the treatments mentioned above.

SUMMARY OF THE PRESENT INVENTION

The objective of this present invention is to solve the problems that single remediation of petroleum hydrocarbon (PHC) contaminated soil does not acts very well and has a high cost when applied in the remediation field. Accordingly, the present invention provides a plant-microorganism combined method for enhanced remediation of PHC contaminated soil. The method bases on the prior arts and utilizes a combination of a higher ornamental plant Impatiens balsamina L. and PHC degrading microorganisms for enhanced remediation of PHC contaminated soil.

Accordingly, in order to accomplish this object, technical solutions of the present invention are as follows.

A plant-microorganism combined method for enhanced remediation of PHC contaminated soil comprises steps of: planting Impatiens balsamina L. with inoculating petroleum hydrocarbon (PHC) degrading mixed microorganisms in PHC contaminated soil. PHC is absorbed and metabolized by the *Impatiens balsamina* L., and could be accumulated in the tissue of *Impatiens balsamina* L. or volatilized by the transpiration. With the synergism effects of the plant (*Impatiens balsamina* L.) and the inoculated microorganisms, PHC contaminants in soil can be effectively degraded and removed, finally the residual amount of PHC in soil will meet the environmental safety standards.

The indigenous PHC degrading mixed microorganisms takes humic acid as a carrier, and 5% (weight percent) of the humic acid related to the contaminated soil is added, each gram of humic acid includes $5 \times 10^9$ (cfu) *Bacillus subtilis*, $5 \times 10^9$ (cfu) *Bacillus licheniformis*, $5 \times 10^9$ (cfu) *Bacillus polymyxa*, $5 \times 10^9$ (cfu) *Trichosporon behrend*, and $5 \times 10^9$ (cfu) *Candida tropicalis*.

The specifically implemented method of the present invention comprises following steps of:

(1) inoculating cultured high-effective petroleum hydrocarbon degrading mixed microorganisms which takes humic acid as a carrier, wherein a mass fraction of the humic acid is 5% of the contaminated soil for inoculation, each gram of humic acid includes $5 \times 10^9$ (cfu) *Bacillus subtilis*, $5 \times 10^9$ (cfu) *Bacillus licheniformis*, $5 \times 10^9$ (cfu) *Bacillus polymyxa*, $5 \times 10^9$ (cfu) *Trichosporon behrend*, and $5 \times 10^9$ (cfu) *Candida tropicalis*;

(2) selecting filled *Impatiens balsamina* L. seeds, culturing the *Impatiens balsamina* L. seeds for about 2 weeks into seedlings utilizing distilled water, transplanting the seedlings of *Impatiens balsamina* L. into the petroleum hydrocarbon contaminated soil in the step (1) with 5% high-effective petroleum hydrocarbon degrading mixed microorganisms;

(3) watering regularly, in such a manner that the water content of the soil maintains at a maximum level of biomass increment, and the degradation rate of the contaminants maintains at a maximum value, the *Impatiens balsamina* L. planted in the petroleum hydrocarbon contaminated soil in the step (2) is cultivated in the greenhouse; and (4) removing the *Impatiens balsamina* L. from the soil when the *Impatiens balsamina* L. is mature and repeating the above steps until the residual petroleum hydrocarbon content in the soil meets the environmental safety standard. With the synergism between *Impatiens balsamina* L. and the indigenous petroleum hydrocarbon degrading microbes, petroleum hydrocarbon contaminant degradation is promoted, therefore decreasing its concentration in soil.

The harvest *Impatiens balsamina* L. is treated with centralized processing, sanitary landfill or resourceful disposal to obtain a certain economic benefits, and avoid secondary pollution as well.

To our best knowledge, the present invention is the first enhanced combined remediation technology of the *Impatiens balsamina* L. and the indigenous PHC degrading mixed microbes which comprise 3 strains of PHC degrading indigenous bacteria and 2 strains of PHC degrading indigenous fungi for efficiently remediation of PHC contaminated soil. *Impatiens balsamina* L. adopted by the present invention is an annual herb ornamental plant, which can well adapt to the drought, barren soil, easily survive after transplantation, and grow fast.

Advantages of the present invention are as follows.

The present invention utilizes the combined technology of the *Impatiens balsamina* L. and the PHC degrading mixing microbes for enhanced remediation of PHC contaminated soil. Compared to the conventional method of remediation of contaminated soil, the present technology requires less investment, less fieldwork and technical operation. Furthermore, as an in-situ green remediation technique, the harvested plants can be processed with centralized treatments without leading to the secondary pollution. Furthermore, the remediation process does not destroy the soil ecological environment and is beneficial for improving the soil productivity and local biological diversity. The utilization of indigenous microorganism does not change local microbial community structure therefore avoiding the secondary pollution. While degrading multiple organic contaminants such as alkanes and aromatics, the effects of single microflora is limited. The biodegradation process requires combined effects of various kinds of enzyme and microbes, wherein the product of one enzyme or microorganism may become the substrate of another enzyme or microorganism. In the technology of the present invention, mixed microbes are inoculated into the contaminated soils, i.e., the association between the indigenous PHC degrading bacteria, fungi and plant for efficiently degrading PHC is obtained. In addition, as an ornamental plant, planting *Impatiens balsamina* L. can not only remediate the contaminated sites, but also beautify the environment, thus satisfying ecological benefits.

These and other objectives, features, and advantages of the present invention will become apparent from the following detailed descriptions, the accompanying drawings, and the appended claims.

BRIEF DESCRIPTION OF THE DRAWINGS

(1) single treatment by planting *Impatiens balsamina* L. (Plant).

(2) planting *Impatiens balsamina* L. with inoculating 5% solution of petroleum hydrocarbon degrading mixed microbes (Plant-IM).

(3) planting *Impatiens balsamina* L. with inoculating solution of plant growth-promoting rhizobacteria (Plant-PGPR); and (4) planting *Impatiens balsamina* L. with inoculating solution of petroleum hydrocarbon degrading mixed microbes and inoculating solution of plant growth-promoting rhizobacteria (Plant-IM-PGPR).

(1) single treatment by planting *Impatiens balsamina* L. (Plant).

(2) planting *Impatiens balsamina* L. with inoculating 5% solution of petroleum hydrocarbon degrading mixed microbes (Plant-IM).

(3) planting *Impatiens balsamina* L. with inoculating solution of plant growth-promoting rhizobacteria (Plant-PGPR); and (4) planting *Impatiens balsamina* L. with inoculating solution of petroleum hydrocarbon degrading mixed microbes and inoculating solution of plant growth-promoting rhizobacteria (Plant-IM-PGPR).

(1) single treatment by planting *Impatiens balsamina* L. (Plant).

(2) planting *Impatiens balsamina* L with inoculating 5% solution of petroleum hydrocarbon degrading mixed microbes (Plant-IM).

(3) planting *Impatiens balsamina* L. with inoculating solution of plant growth-promoting rhizobacteria (Plant-PGPR); and (4) planting *Impatiens balsamina* L. with inoculating solution of petroleum hydrocarbon degrading mixed microbes and inoculating solution of plant growth-promoting rhizobacteria (Plant-IM-PGPR).

(1) single treatment by planting *Impatiens balsamina* L. (Plant).

(2) planting *Impatiens balsamina* L with inoculating 5% solution of petroleum hydrocarbon degrading mixed microbes (Plant-IM).

(3) planting *Impatiens balsamina* L. with inoculating solution of plant growth-promoting rhizobacteria (Plant-PGPR); and (4) planting *Impatiens balsamina* L. with inoculating solution of petroleum hydrocarbon degrading mixed microbes and inoculating solution of plant growth-promoting rhizobacteria (Plant-IM-PGPR).

(1) single treatment by planting *Impatiens balsamina* L. (Plant).

(2) planting *Impatiens balsamina* L with inoculating 5% solution of petroleum hydrocarbon degrading mixed microbes (Plant-IM).

(3) planting *Impatiens balsamina* L. with inoculating solution of plant growth-promoting rhizobacteria (Plant-PGPR); and (4) planting *Impatiens balsamina* L. with inoculating solution of petroleum hydrocarbon degrading mixed microbes and inoculating solution of plant growth-promoting rhizobacteria (Plant-IM-PGPR).

(1) single treatment by planting *Impatiens balsamina* L. (Plant).

(2) planting *Impatiens balsamina* L with inoculating 5% solution of petroleum hydrocarbon degrading mixed microbes (Plant-IM).

(3) planting *Impatiens balsamina* L. with inoculating solution of plant growth-promoting rhizobacteria (Plant-PGPR); and (4) planting *Impatiens balsamina* L. with inoculating solution of petroleum hydrocarbon degrading mixed microbes and inoculating solution of plant growth-promoting rhizobacteria (Plant-IM-PGPR).

In the FIG. 4: NAP-Naphthalene; ACY-Acenaphthylene; ACE-Acenaphthene; FLU-Fluorene; PHE-Phenanthrene; ANT-Anthracene; FLT-Fluoranthene; PYR-Pyrene; BaA-Benz(a)anthracene; CHR-Chrysene; BbF-Benzo(b)fluoranthene; BkF-Benzo(k)fluoranthene; BaP-Benzo(a)Pyrene; IPY-Indeno(1,2,3-cd)pyrene; DaA-Dibenz(ah)anthracene; BgP-Benzo(ghi)perylene.

DETAILED DESCRIPTION OF THE PREFERRED EMBODIMENT

EXAMPLE 1

Pot Culture Experiment of *Impatiens balsamina* L. Inoculated with Microorganism in Greenhouse The example adopts a greenhouse pot culture experiment. The experiment is located in a greenhouse of Nankai University. The original petroleum contaminated soil in this experiment is taken from Shengli oil field in Dongying, Shandong province of China. The original petroleum contaminated soil and clean soil are sieved by 10 mesh and uniformly mixed according to a certain proportion, so as to prepare experimental petroleum contaminated soil with a mass concentration of 1% (10,000 mg/kg). Then the experimental petroleum contaminated soil is prepared for 3000 g each pot. Mixed microbes adopt 3 strains of bacteria: *Bacillus subtilis*, *Bacillus licheniformis* and *Bacillus polymyxa*, and 2 strains of fungi: *Trichosporon behrend*, and *Candida tropicalis*, 5% of the humic acid related to the contaminated soil was added into the contaminated soil, each gram of humic acid includes $5 \times 10^9$ (cfu) *Bacillus subtilis*, $5 \times 10^9$ (cfu) *Bacillus licheniformis*, $5 \times 10^9$ (cfu) *Bacillus polymyxa*, $5 \times 10^9$ (cfu) *Trichosporon behrend*, and $5 \times 10^9$ (cfu) *Candida tropicalis*. Four treatments are processed as follows:

(1) single treatment by planting *Impatiens balsamina* L.;

(2) planting *Impatiens balsamina* L. with inoculating 5% (mass fraction) solution of petroleum hydrocarbon degrading mixed microbes;

(3) planting *Impatiens balsamina* L. treated by plant growth-promoting rhizobacteria, wherein seeds of the *Impatiens balsamina* L. are soaked for 2 hours in solution containing the plant growth-promoting rhizobacteria which comprises: $10^7$ cfu/ml azotobacter, $10^7$ cfu/ml phosphorus-solubilizing bacteria and $10^7$ cfu/ml potassium bacteria; and (4) planting *Impatiens balsamina* L, inoculating solution of petroleum hydrocarbon degrading mixed microbes and inoculating solution of plant growth-promoting rhizobacteria, wherein seeds of the *Impatiens balsamina* L. are soaked for 2 hours in solution containing the plant growth-promoting rhizobacteria comprising: $10^7$ cfu/ml azotobacter, $10^7$ cfu/ml phosphorus-solubilizing bacteria and $10^7$ cfu/ml potassium bacteria.

The method of the present invention specifically comprises following steps of:

(1) inoculating cultured high-effective petroleum hydrocarbon degrading mixed microorganisms which takes humic acid as a carrier, wherein a mass fraction of the humic acid is 5% of the contaminated soil for inoculation, each gram of humic acid includes $5 \times 10^9$ (cfu) *Bacillus subtilis*, $5 \times 10^9$ (cfu) *Bacillus licheniformis*, $5 \times 10^9$ (cfu) *Bacillus polymyxa*, $5 \times 10^9$ (cfu) *Trichosporon behrend*, and $5 \times 10^9$ (cfu) *Candida tropicalis*;

(2) selecting filled *Impatiens balsamina* L. seeds, culturing the *Impatiens balsamina* L. seeds for about 2 weeks into seedlings utilizing distilled water, transplanting the seedlings of *Impatiens balsamina* L. into the petroleum hydrocarbon contaminated soil in the step (1) with 5% high-effective petroleum hydrocarbon degrading mixed microorganisms;

(3) watering regularly, in such a manner that the water content of the soil maintains at a maximum level of biomass increment, and the degradation rate of the contaminants maintains at a maximum value, the *Impatiens balsamina* L. planted in the petroleum hydrocarbon contaminated soil in the step (2) is cultivated in the greenhouse; and (4) removing the *Impatiens balsamina* L. from the soil when the *Impatiens balsamina* L. is mature and repeating the above steps until the residual petroleum hydrocarbon content in the soil meets the environmental safety standard. With the synergism between *Impatiens balsamina* L. and the indigenous petroleum hydrocarbon degrading microbes, petroleum hydrocarbon contaminant degradation is promoted, therefore decreasing its concentration in soil.

*Impatiens balsamina* L. is harvested after maturing, and then the rhizosphere soil is collected. The seedbed is watered thoroughly before planting seeds in order to maintain the humidity. Seeds of the *Impatiens balsamina* L. are soaked in distilled water until roots are grown up. 3 seedlings are planted in a certain distance into one pot. The soil is watered irregularly according to water content in order to keep the water content of the soil at a maximum level for better biomass increment, and better degradation rate of the contaminants. During the growth of the *Impatiens balsamina* L., loosening the soil by bamboo chip or shovel with the angle of approximately 45° to prevent the roots from being cut and make the soil have sufficient oxygen, which is beneficial to both the *Impatiens balsamina* L. growth and microbial propagation. During the growth period, the soil is watered once a day. If it's in hot summer, the soil should be watered twice a day.

In order to prevent producing powdery mildew and affecting the combined remediation effect, *Impatiens balsamina* L. is processed with proper ventilation, managed with strengthened fertilization. Appearance of powdery mildew on the *Impatiens balsamina* L can be treated with 1000~1200 fold dilution of 15% Triadimefon wettable powder or 1000 fold dilution of 70% thiophanate methyl wettable powder. The agricultural agent is avoided to be sprayed over 32° C. in order to prevent phytotoxicity.

Plant is harvested after the fruiting period. Harvested plants are classified into an aerial part and an underground part, which are washed under the tape water to remove soil and sewage adhered on the plant. Then washing them with deionized water and dried under freeze-drying process. Then determining height of the plant, length of roots, weight of the aerial part and the underground part of it.

Further description of the present invention is illustrated according to the accompanying drawings.

Figure 1A:
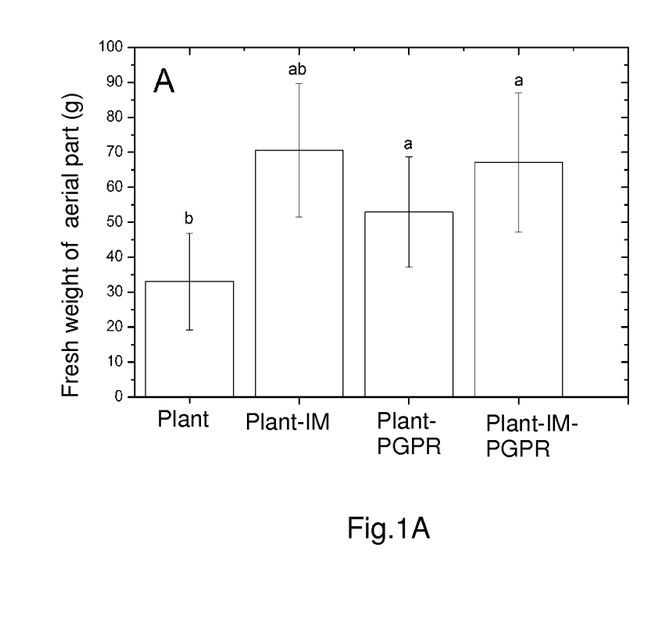
FIG. 1A shows the effect of different treatments on weight (g) of an aerial part of *Impatiens balsamina* L. in different treatments, from left to right.
Figure 1B:
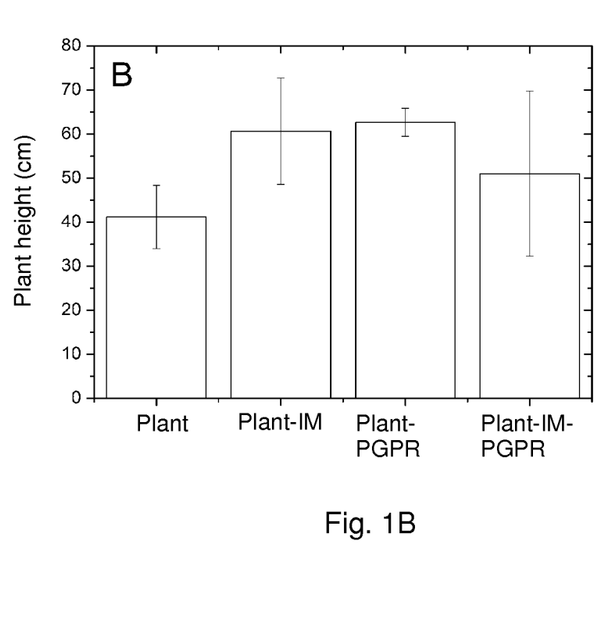
FIG. 1B shows the effect of different treatments on height (cm) of an aerial part of *Impatiens balsamina* L. in different treatments, from left to right.

1. Tolerance of the *Impatiens balsamina* L under different treatments in the petroleum hydrocarbon contaminated soil FIG. 1A shows the effect of different treatments on the weight (g) of an aerial part of *Impatiens balsamina* L., FIG. 1B shows the effect of different treatments on height (cm) of an aerial part of *Impatiens balsamina* L., from left to right of the treatment groups:

(1) single treatment by planting *Impatiens balsamina* L. (Plant);

(2) planting *Impatiens balsamina* L with inoculating 5% solution of petroleum hydrocarbon degrading mixed microbes (Plant-IM);

(3) planting *Impatiens balsamina* L. with inoculating solution of plant growth-promoting rhizobacteria (Plant-PGPR); and (4) planting *Impatiens balsamina* L. with inoculating solution of petroleum hydrocarbon degrading mixed microbes and inoculating solution of plant growth-promoting rhizobacteria (Plant-IM-PGPR).

What can be obtained from FIG. 1A and FIG. 1B are illustrated as follows. The *Impatiens balsamina* L under treatments of planting *Impatiens balsamina* L with inoculating solution of PHC degrading mixed microbes (Plant-IM), planting *Impatiens balsamina* L. with inoculating solution of plant growth-promoting rhizobacteria (Plant-PGPR), planting *Impatiens balsamina* L. with inoculating solution of PHC degrading mixed microbes and solution of plant growth-promoting rhizobacteria (Plant-IM-PGPR) all have a significantly increased weight of the aerial part than that by the single treatment of *Impatiens balsamina* L (Plant) ($\alpha$=0.05), which are 1.6 times, 2.13 times and 2.02 times of that under the Plant treatment respectively. Heights of stem are 1.52, 1.47, 1.23 times respectively of that under single treatment by planting *Impatiens balsamina* L (Plant).

Figure 2A:
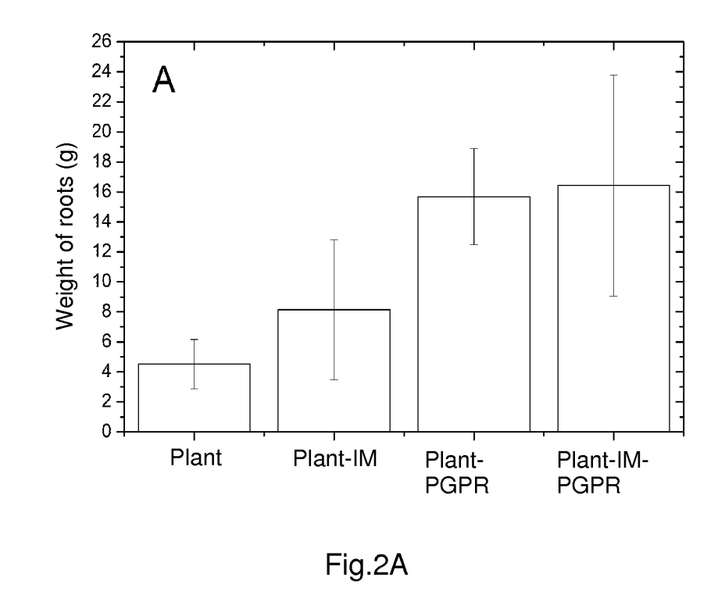
FIG. 2A shows the effect of different treatments on weight (g) of roots of *Impatiens balsamina* L in different treatments, from left to right.
Figure 2B:
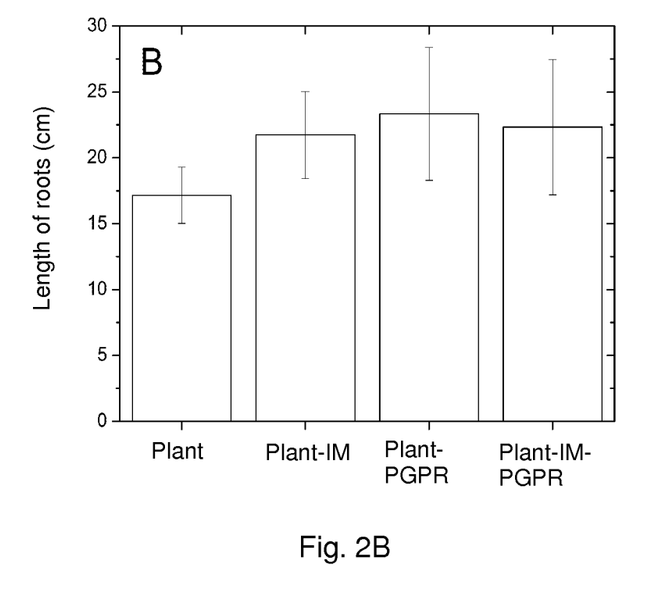
FIG. 2B shows the effect of different treatments on length (cm) of roots of *Impatiens balsamina* L in different treatment groups, from left to right.

FIG. 2A shows the effect of different treatments on weight (g) of roots of *Impatiens balsamina* L. FIG. 2B shows the effect of different treatments on length (cm) of roots of *Impatiens balsamina* L., from left to right:

(1) single treatment by planting *Impatiens balsamina* L. (Plant);

(2) planting *Impatiens balsamina* L with inoculating 5% solution of petroleum hydrocarbon degrading mixed microbes (Plant-IM);

(3) planting *Impatiens balsamina* L. with inoculating solution of plant growth-promoting rhizobacteria (Plant-PGPR); and (4) planting *Impatiens balsamina* L. with inoculating solution of petroleum hydrocarbon degrading mixed microbes and inoculating solution of plant growth-promoting rhizobacteria (Plant-IM-PGPR).

The weight of aerial part roots of the *Impatiens balsamina* L under treatments of *Impatiens balsamina* L. with solution of PHC degrading mixed microbes (Plant-IM), *Impatiens balsamina* L and solution of plant growth-promoting rhizobacteria (Plant-PGPR), and *Impatiens balsamina* L, solution of PHC degrading mixed microbes and inoculating solution of plant growth-promoting rhizobacteria (Plant-IM-PGPR) is 1.80, 3.48 and 3.64 times respectively than that under the single treatment of *Impatiens balsamina* L (Plant). In Plant-PGPR treatment, root weight of the *Impatiens balsamina* L is significantly increased, and root length of the *Impatiens balsamina* L are 1.2, 1.3 and 1.3 times respectively than that under the single treatment by planting *Impatiens balsamina* L.

The results show that the plant growth-promoting rhizobacteria, as a microbial fertilizer, provides the *Impatiens balsamina* L with required nutrients for growth, enhances tolerance of plants in 10,000 mg/kg petroleum contaminated soil, and increases plant biomass. Inoculation of microorganisms can enhance resistance of the *Impatiens balsamina* L.

Figure 3:
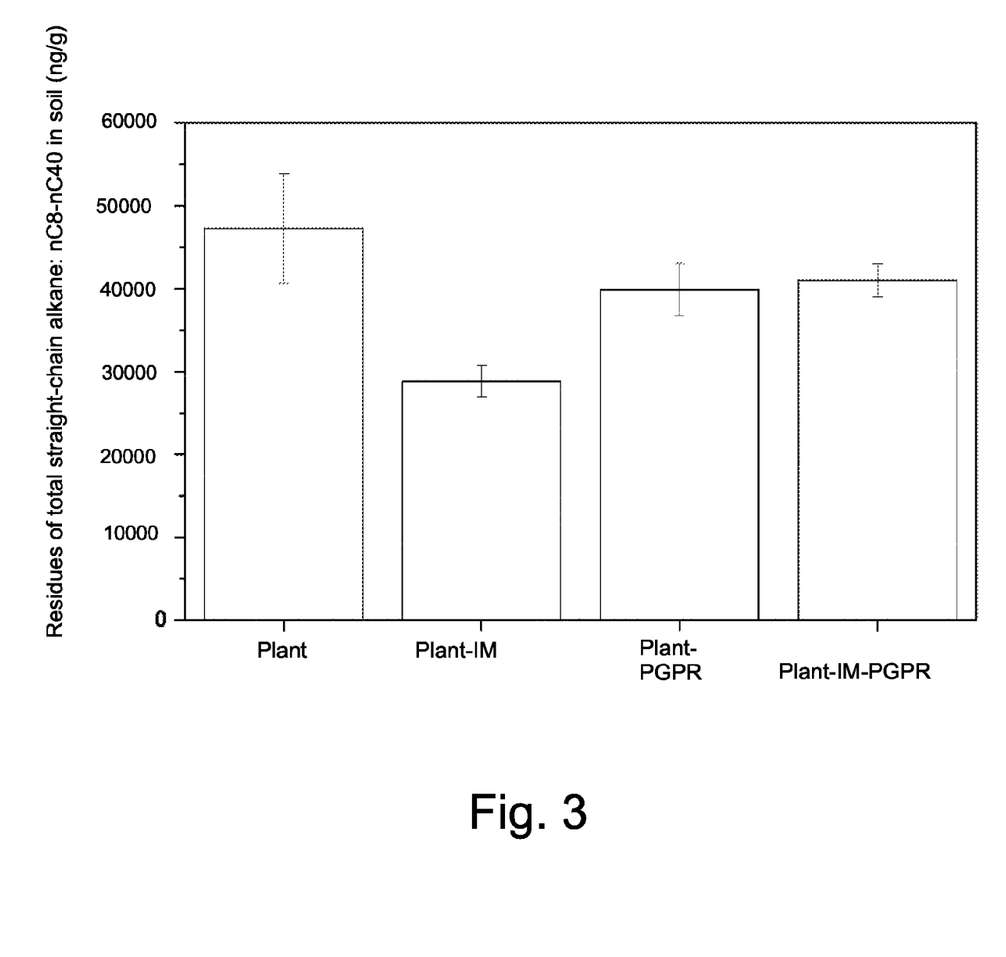
FIG. 3 shows the residues of straight-chain alkane: nC8-nC40 in soil of different treatments, from left to right.

2. Residues of straight-chain alkane: nC8-nC40 in soil under different treatments Residues of straight-chain alkane: nC8-nC40 in soil under different treatments are analyzed by gas chromatograph-mass spectrometer (GC-MS). FIG. 3 shows the residual straight-chain alkane: nC8-nC40 in soil under four different treatments, from left to right:

(1) single treatment by planting *Impatiens balsamina* L. (Plant);

(2) planting *Impatiens balsamina* L with inoculating 5% solution of petroleum hydrocarbon degrading mixed microbes (Plant-IM);

(3) planting *Impatiens balsamina* L. with inoculating solution of plant growth-promoting rhizobacteria (Plant-PGPR); and (4) planting *Impatiens balsamina* L. with inoculating solution of petroleum hydrocarbon degrading mixed microbes and inoculating solution of plant growth-promoting rhizobacteria (Plant-IM-PGPR).

The degradation rate of straight-chain alkanes (nC8-nC40) in combined treatment group of planting *Impatiens balsamina* L. with inoculating solution of PHC degrading mixed microbes (Plant+IM) is 39.0% higher than that under the group of the single treatment by planting *Impatiens balsamina* L. (Plant). The degradation rate of straight-chain alkanes (nC8-nC40) under treatments of planting *Impatiens balsamina* L with inoculating solution of plant growth-promoting rhizobacteria (Plant-PGPR) and planting *Impatiens balsamina* L with inoculating solution of petroleum degrading mixed microbes and solution of plant growth-promoting rhizobacteria (Plant-IM-PGPR) is 15.6% and 13.2% respectively higher than that under the single treatment by planting *Impatiens balsamina* L. (Plant). It can be obtained from analysis of experimental data that the treatment of Plant-IM has a significantly promoting effect on the degradation of straight-chain alkanes. The synergism between plant and microorganisms in the Plant-IM treatment accelerates the degradation rate of straight-chain alkanes.

3. Residues of 16 Priority EPA PAHs in soil under different treatments

Figure 4:
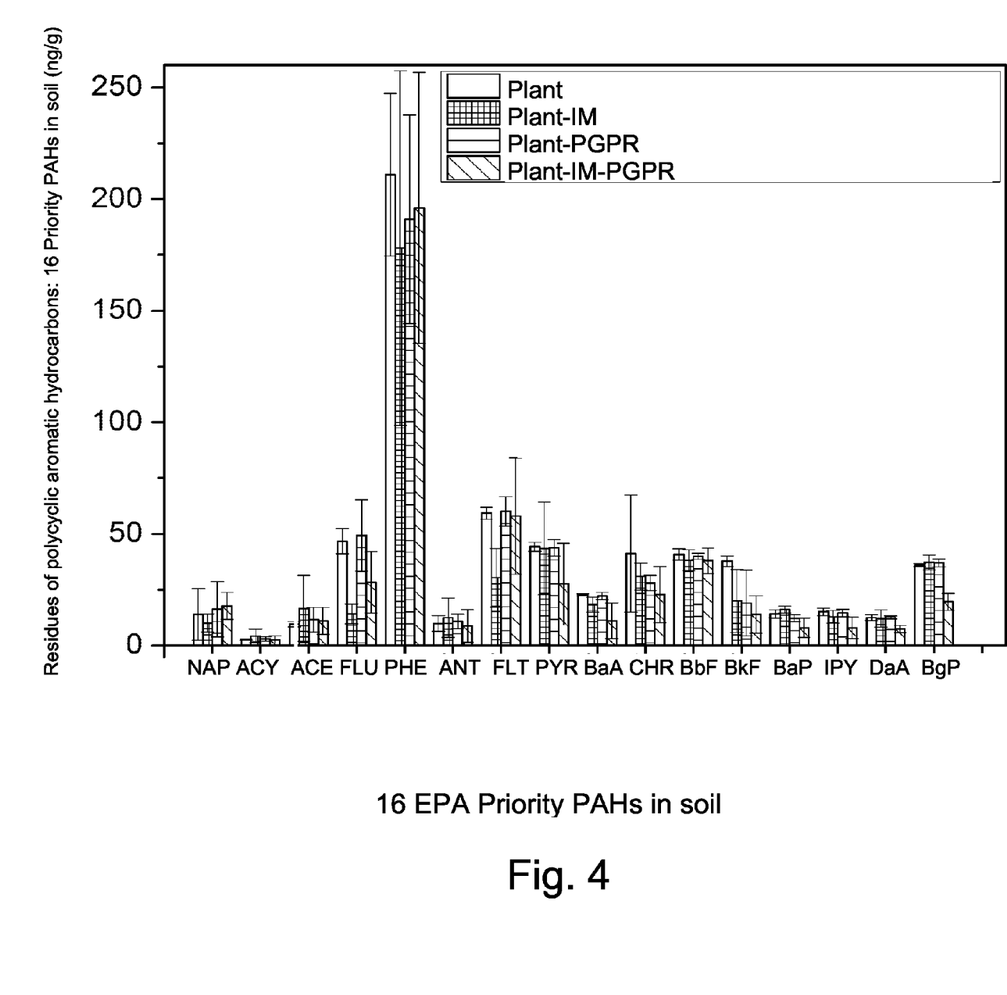
FIG. 4 shows the residues of polycyclic aromatic hydrocarbons: 16 EPA Priority PAHs in soil of different treatments, from left to right.

Residues of 16 kinds of polycyclic aromatic hydrocarbons in soil under different treatments are analyzed by GC-MS as well. FIG. 4 shows 16 Priority EPA PAHs data under four different treatments, from left to right of the treatment group:

(1) single treatment by planting *Impatiens balsamina* L. (Plant);

(2) planting *Impatiens balsamina* L with inoculating 5% solution of petroleum hydrocarbon degrading mixed microbes (Plant-IM);

(3) planting *Impatiens balsamina* L. with inoculating solution of plant growth-promoting rhizobacteria (Plant-PGPR); and (4) planting *Impatiens balsamina* L. with inoculating solution of petroleum hydrocarbon degrading mixed microbes and inoculating solution of plant growth-promoting rhizobacteria (Plant-IM-PGPR).

The degradation rate of total polycyclic aromatic hydrocarbons in the combined treatment group of planting *Impatiens balsamina* L, inoculating solution of PHC degradation bacteria is higher than that under the single treatment by planting *Impatiens balsamina* L. (Plant). Both the planting *Impatiens balsamina* L and inoculating solution of plant growth-promoting rhizobacteria (Plant-PGPR) and planting *Impatiens balsamina* L with inoculating solution of petroleum degrading mixed microbes and inoculating solution of plant growth-promoting rhizobacteria (Plant-IM-PGPR) are higher than that under the single treatment by planting *Impatiens balsamina* L. It can be seen from the results that planting *Impatiens balsamina* L. with inoculating solution of petroleum degrading mixed microbes has a significantly promoting effect on the PHC degradation. The combined treatment between *Impatiens balsamina* L and the microorganism (Plant-IM) have synergistic effect and can achieve a better degradation effect.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claim.

What is claimed is:

1. A plant-microorganism combined method for enhanced phytoremediation of petroleum contaminated soil, comprising steps of:

identifying petroleum contaminated soil;

planting *Impatiens balsamina* L. and inoculating petroleum degrading mixed microbes in the petroleum contaminated soil, so as to degrade target contaminants by plant-microorganism synergistic effect, in such a manner that an object of removing petroleum hydrocarbons (PHC) contaminants in the soil is achieved, wherein the PHC degrading mixed microbes comprises 5 strains, which includes:

3 strains of bacteria for degrading PHC: *Bacillus subtilis*, *Bacillus licheniformis* and *Bacillus polymyxa*, and 2 strains of fungi for degrading PHC: *Trichosporon behrend*, and *Candida tropicalis*.

2. The method, as recited in claim 1, comprising:

(1) inoculating the petroleum contaminated soil with the petroleum hydrocarbon degrading mixed microbes using humic acid as a carrier, wherein each gram of humic acid includes at least $5\times10^9$ (cfu) *Bacillus subtilis*, $5\times10^9$ (cfu) *Bacillus licheniformis*, $5\times10^9$ (cfu) *Bacillus polymyxa*, $5\times10^9$ (cfu) *Trichosporon behrend*, and $5\times10^9$ (cfu) *Candida tropicalis;*

(2) selecting *Impatiens balsamina* L. seeds, culturing the *Impatien balsamina* seeds into seedlings utilizing distilled water, and transplanting the seedlings of *Impatiens balsamina* L. in the petroleum contaminated soil containing the inoculated microbes from step (1);

(3) watering regularly, in such a manner that water content of the soil maintains at a maximum level for biomass increment, and degradation rate of the contaminants maintains at a maximum value as well, and (4) removing the *Impatiens balsamina* from the soil when the *Impatiens balsamina* is mature and repeating steps (1)-(3) above until petroleum hydrocarbon content in the soil meets the environmental safety standard, wherein by the combined effect of the *Impatiens balsamina* and the petroleum degrading microbes, degradation of petroleum hydrocarbon contaminants is promoted, in such a manner that the concentration of the petroleum hydrocarbon in soil is decreased.

3. The method, as recited in claim 2, wherein in step (1) the petroleum contaminated soil is inoculated with a 5% mass fraction of the humic acid carrier relative to the contaminated soil.

\* \* \* \* \*